(12) United States Patent
Lee

(10) Patent No.: US 10,503,452 B2
(45) Date of Patent: Dec. 10, 2019

(54) SERVER, CONTROL PROGRAM, AND APPARATUS

(71) Applicant: BROTHER KOGYO KABUSHIKI KAISHA, Nagoya-shi, Aichi-ken (JP)

(72) Inventor: Tony Lee, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/923,198

(22) Filed: Mar. 16, 2018

(65) Prior Publication Data

US 2018/0267756 A1    Sep. 20, 2018

(30) Foreign Application Priority Data

Mar. 16, 2017 (JP) ................................ 2017-051172

(51) Int. Cl.
*G06F 3/12* (2006.01)
*B41J 2/165* (2006.01)
(Continued)

(52) U.S. Cl.
CPC ............ *G06F 3/1294* (2013.01); *B41J 2/165* (2013.01); *B41J 2/16517* (2013.01); *B41J 2/17566* (2013.01); *B41J 29/393* (2013.01); *G06F 3/1203* (2013.01); *G06F 3/1229* (2013.01); *G06F 3/1273* (2013.01); *G06F 3/1287* (2013.01); *G06K 15/40* (2013.01); *G06K 15/407* (2013.01); *B41J 2002/16573* (2013.01); *B41J 2002/17589* (2013.01); *G06K 2215/101* (2013.01)

(58) Field of Classification Search
None
See application file for complete search history.

(56) References Cited

U.S. PATENT DOCUMENTS 6,364,442 B1    4/2002  Kawase et al.
9,533,491 B1 *  1/2017  LeFevre ................. B41J 2/0451
(Continued)

FOREIGN PATENT DOCUMENTS

JP    H06-210934 A    8/1994
JP    H11-208071 A    8/1999
(Continued)

*Primary Examiner* — Anh-Vinh T Nguyen
(74) *Attorney, Agent, or Firm* — Scully, Scott, Murphy & Presser, P.C.

(57) ABSTRACT

A server includes: a communicator communicable with an apparatus configured to perform a scanning operation and a printing operation using an ink-jet head; and a controller. The controller controls the server to: receive, from the apparatus, scan data representing a printing sheet printed by the ink-jet head; determine whether cleaning of the ink-jet head is required, based on the received scan data; transmit permission information to the apparatus when the server determines that the cleaning of the ink-jet head is required, the permission information indicating permission of the cleaning of the ink-jet head; and transmit non-permission information to the apparatus when the server determines that the cleaning of the ink-jet head is not required, the non-permission information indicating non-permission of the cleaning of the ink-jet head.

11 Claims, 9 Drawing Sheets

(51) Int. Cl.
*G06K 15/00* (2006.01)
*B41J 29/393* (2006.01)
*B41J 2/175* (2006.01)

(56) References Cited

U.S. PATENT DOCUMENTS

| | | | |
|---|---|---|---|
| 2001/0015818 A1* | 8/2001 | Kawanabe | B41J 2/165 |
| | | | 358/1.15 |
| 2001/0043249 A1 | 11/2001 | Tabuchi | |
| 2002/0037177 A1 | 3/2002 | Kanoshima et al. | |
| 2003/0009383 A1* | 1/2003 | Mori | G06Q 10/08 |
| | | | 705/22 |
| 2003/0228163 A1* | 12/2003 | Yokoi | G03G 15/55 |
| | | | 399/27 |
| 2005/0168516 A1* | 8/2005 | Koike | B41J 2/16517 |
| | | | 347/23 |
| 2006/0173561 A1* | 8/2006 | Aoki | H04N 1/00885 |
| | | | 700/52 |
| 2007/0035573 A1* | 2/2007 | Hoshi | B41J 2/16547 |
| | | | 347/22 |
| 2007/0091140 A1* | 4/2007 | Taga | B41J 2/165 |
| | | | 347/30 |
| 2011/0135336 A1 | 6/2011 | Yamamoto | |
| 2011/0135337 A1 | 6/2011 | Saito et al. | |
| 2011/0310428 A1* | 12/2011 | Ciriza | G06F 1/3203 |
| | | | 358/1.15 |
| 2013/0002752 A1 | 1/2013 | Shiraiwa et al. | |
| 2013/0282503 A1* | 10/2013 | Shiraiwa | G03G 21/02 |
| | | | 705/21 |
| 2014/0282996 A1 | 9/2014 | Mori | |
| 2015/0020169 A1 | 1/2015 | Mori | |
| 2015/0273923 A1* | 10/2015 | Chen | B41J 29/393 |
| | | | 347/19 |
| 2016/0292550 A1 | 10/2016 | Kawai | |
| 2016/0292774 A1 | 10/2016 | Ohara | |
| 2017/0061268 A1 | 3/2017 | Miyazawa | |
| 2017/0063646 A1 | 3/2017 | Kawai | |
| 2017/0094077 A1* | 3/2017 | Simpson | H04N 1/00344 |
| 2017/0126908 A1* | 5/2017 | Ahmadyar | H04N 1/00344 |
| 2017/0259574 A1* | 9/2017 | Fujioka | B41J 2/16535 |
| 2018/0115674 A1* | 4/2018 | Imai | H04N 1/00896 |
| 2018/0267748 A1* | 9/2018 | Takizawa | G06F 3/1208 |
| 2018/0311951 A1* | 11/2018 | Sakamoto | B41J 2/01 |
| 2018/0326719 A1* | 11/2018 | Masuda | B41J 2/01 |
| 2019/0001662 A1* | 1/2019 | Takeuchi | B41J 2/0057 |
| 2019/0016114 A1* | 1/2019 | Sugiyama | B41J 2/0057 |
| 2019/0039312 A1* | 2/2019 | Ge | B33Y 30/00 |

FOREIGN PATENT DOCUMENTS

| | | |
|---|---|---|
| JP | 2002-046293 A | 2/2002 |
| JP | 2002-366333 A | 12/2002 |
| JP | 2003-228261 A | 8/2003 |
| JP | 3553912 B2 | 8/2004 |
| JP | 4531308 B2 | 8/2010 |
| JP | 2011-118206 A | 6/2011 |
| JP | 2011-118285 A | 6/2011 |
| JP | 2013-012103 A | 1/2013 |
| JP | 2014-178984 A | 9/2014 |
| JP | 2015-018473 A | 1/2015 |
| JP | 2016-193592 A | 11/2016 |
| JP | 2016-194904 A | 11/2016 |
| JP | 2017-047537 A | 3/2017 |
| JP | 2017-049767 A | 3/2017 |

* cited by examiner

FIG.12

There is possibility
of failure in printer.
A new printer
will be shipped.

SERVER, CONTROL PROGRAM, AND APPARATUS

CROSS REFERENCE TO RELATED APPLICATION

The present application claims priority from Japanese Patent Application No. 2017-051172, which was filed on Mar. 16, 2017, the disclosure of which is herein incorporated by reference in its entirety.

BACKGROUND

The following disclosure relates to a server communicable with an apparatus capable of performing a printing operation using an ink-jet head, to a non-transitory storage medium storing a program readable by a computer of the server, and to the apparatus.

In an apparatus including an ink-jet head capable of performing a printing operation, ink is used not only when an image is printed on a sheet but also when cleaning of nozzles is performed in maintenance of the ink-jet head. There is known a technique in which an amount of the ink used for the printing and an amount of the ink used for the maintenance are managed individually.

SUMMARY

In the technique in which the amount of the ink used for the printing and the amount of the ink used for the maintenance are managed individually, in the case where a system which makes a charge in accordance with an amount of usage of the ink is employed, for example, it is possible to establish a good charging system by considering the amount of the ink used for the maintenance. However, only the individual management of the amount of the ink used for the printing and the amount of the ink used for the maintenance is not enough to reduce the amount of the ink used for the maintenance. Accordingly, an aspect of the disclosure relates to a server, a non-transitory storage medium storing a program readable by a computer of the server, and an apparatus, which reduce an amount of ink used for maintenance.

In one aspect of the disclosure, a server, comprises: a communicator communicable with an apparatus configured to perform a scanning operation and a printing operation using an ink-jet head; and a controller configured to control the server to perform: receiving, from the apparatus, scan data representing a printing sheet printed by the ink-jet head; determining whether cleaning of the ink-jet head is required, based on the received scan data; transmitting permission information to the apparatus when the server determines that the cleaning of the ink-jet head is required, the permission information indicating permission of the cleaning of the ink-jet head; and transmitting non-permission information to the apparatus when the server determines that the cleaning of the ink-jet head is not required, the non-permission information indicating non-permission of the cleaning of the ink-jet head.

In another aspect of the disclosure, a non-transitory storage medium stores a program readable by a computer of a server comprising a communicator communicable with an apparatus configured to perform a scanning operation and a printing operation using an ink-jet head, the program being configured to cause the server to perform: receiving, from the apparatus, scan data representing a printing sheet printed by the ink-jet head; determining whether cleaning of the ink-jet head is required, based on the received scan data; transmitting permission information to the apparatus when the server determines that the cleaning of the ink-jet head is required, the permission information indicating permission of the cleaning of the ink-jet head; and transmitting non-permission information to the apparatus when the server determines that the cleaning of the ink-jet head is not required, the non-permission information indicating non-permission of the cleaning of the ink-jet head.

In yet another aspect of the disclosure, an apparatus comprises: a communicator communicable with a server; an image reader configured to read an image formed on a document; an image recorder configured to use an ink-jet head to print an image on a sheet; a cleaner configured to perform cleaning of the ink-jet head; and a controller configured to perform: controlling the image recorder to print the image on the sheet; controlling the image reader to read the image printed by the image recorder; controlling the communicator to transmit, to the server, image data representing the image read by the image reader; and controlling the cleaner to perform the cleaning of the ink-jet head when the communicator receives information indicating permission of the cleaning of the ink-jet head, the information being transmitted when the server determines that the cleaning of the ink-jet head is required, based on the image data transmitted by the communicator.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 12 is a view illustrating a failure notification screen.

DETAILED DESCRIPTION OF THE EMBODIMENT

Hereinafter, there will be described one embodiment by reference to the drawings.

Configuration of Communication System

Figure 1:
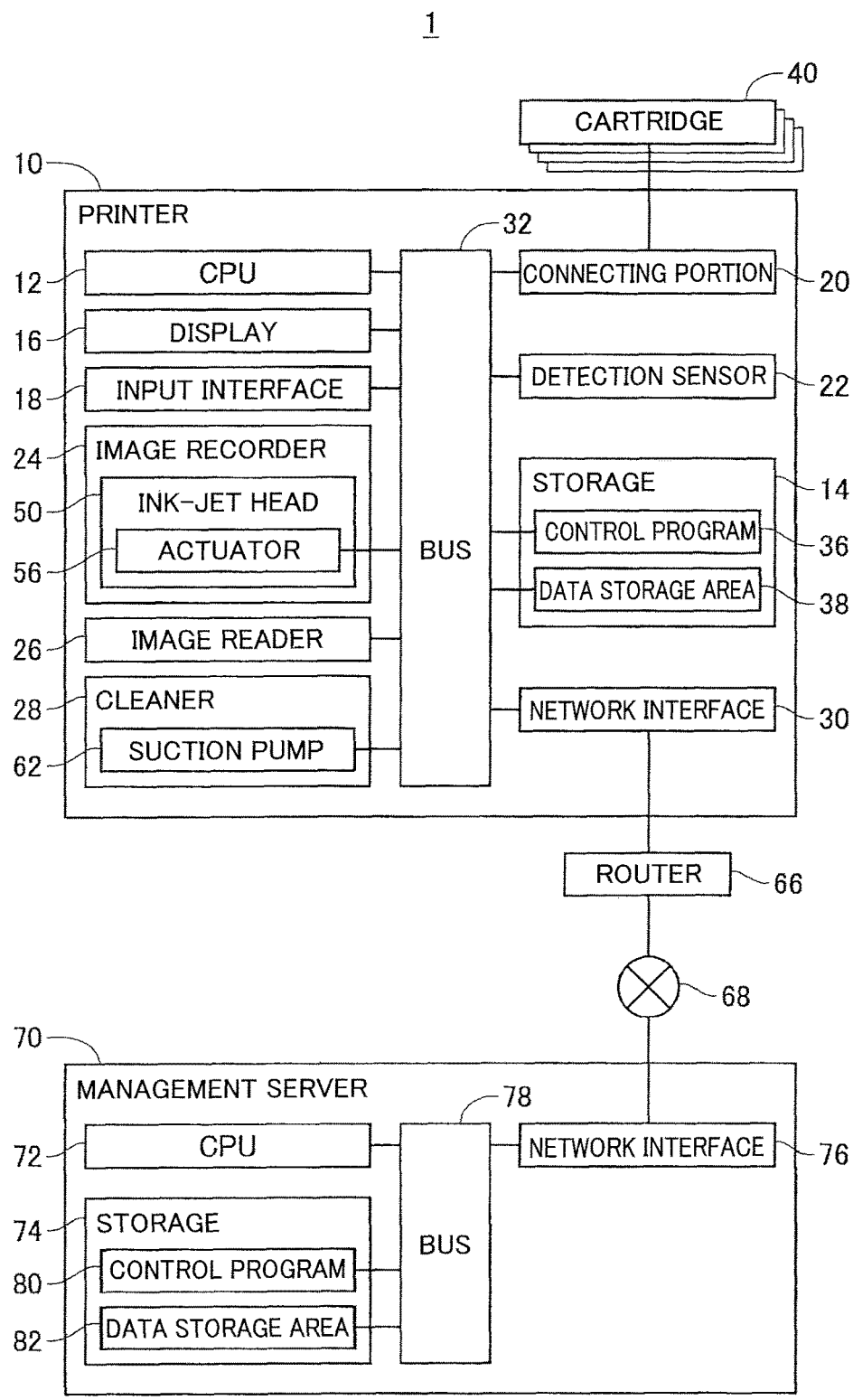
FIG. 1 is a block diagram illustrating a communication system.

FIG. 1 is a block diagram illustrating a communication system 1 according to one embodiment. The communication system 1 includes a printer 10 as one example of an apparatus, and a management server 70 as one example of a server.

The printer 10 includes a central processing unit (CPU) 12 as one example of a controller, a storage 14, a display 16, an input interface 18, a connecting portion 20, a detection sensor 22, an image recorder 24, an image reader 26 as one example of an image reader, a cleaner 28, and a network interface 30 as one example of a communicator. These devices are communicable with each other by a bus 32.

The CPU 12 executes processings according to a control program 36 stored in the storage 14. The control program 36 is a program for a printing operation. It is noted that the storage 14 includes a random access memory (RAM), a read only memory (ROM), a flash memory, a hard disk (HDD), and a buffer of the CPU 12 which are constituted in combination. The storage 14 has a data storage area 38. The data storage area 38 stores data and information required for execution of the control program 36.

The display 16 displays various kinds of screens based on input image data. Examples of the display 16 include a liquid crystal display (LCD) and an organic electroluminescence (EL) display. The input interface 18 includes keys respectively for execution of functions of the printer 10. One example of the input interface 18 is a touch screen formed integrally with the display 16. In this case, the input interface 18 accepts a user operation performed for an icon displayed on the display 16. Other examples of the input interface 18 include hardware keys.

The connecting portion 20 is formed on a housing of the printer 10. Cartridges 40 storing ink are connectable to the connecting portion 20. Each of the cartridges 40 is one example of an ink cartridge. It is noted that the cartridges 40 respectively storing inks of four colors, namely black, yellow, cyan, and magenta, are connectable to the connecting portion 20. For each of the four colors, the detection sensor 22 detects a remaining amount of the ink in the cartridge 40 connected to the connecting portion 20.

Figure 2:
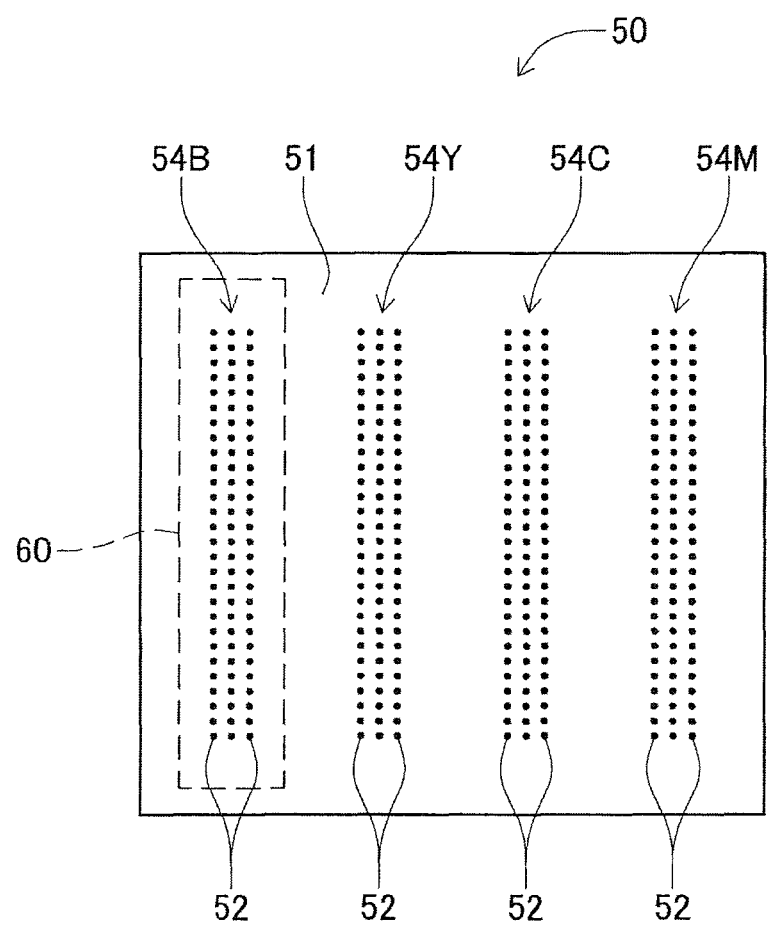
FIG. 2 is a view of a nozzle surface of an ink-jet head.

The image recorder 24 performs the printing operation and includes an ink-jet head 50. As illustrated in FIG. 2, a nozzle surface 51 of the ink-jet head 50 has a multiplicity of nozzles 52. For each ink color, openings of the nozzles 52 are arranged in three rows, and the nozzles 52 in this state form a nozzle group 54. Specifically, a nozzle group 54B is constituted by the nozzles 52 for ejecting the black ink. A nozzle group 54Y is constituted by the nozzles 52 for ejecting the yellow ink. A nozzle group 54C is constituted by the nozzles 52 for ejecting the cyan ink. A nozzle group 54M is constituted by the nozzles 52 for ejecting the magenta ink. For each ink color, the nozzles 52 of the nozzle group 54 are connected to the cartridge 40 respectively by ink passages, not illustrated. Actuators 56 (see FIG. 1) for, e.g., piezoelectric elements, are respectively provided on the ink passages, and these actuators 56 are actuated in response to drive signals output from the CPU 12. As a result, the ink is ejected from the nozzles 52 to record an image on a printing sheet.

The image reader 26 performs a scanning operation. The image reader 26 includes a reading device, such as a charge-coupled-device (CCD) image sensor and a contact image sensor, which reads an image formed on a document to create image data. The cleaner 28 cleans the nozzles 52 formed in the ink-jet head 50 and includes nozzle caps 60 (see FIG. 2) for the respective four ink colors. For each ink color, as illustrated in FIG. 2, the nozzle cap 60 is closely contactable with the nozzle surface 51 in a state in which the nozzle cap 60 covers the corresponding nozzle group 54 constituted by the nozzles 52. The nozzle cap 60 is coupled to a suction pump 62 (see FIG. 1). When air is sucked by the suction pump 62 in the state in which the nozzle group 54 is covered with the nozzle cap 60, the ink is sucked from the nozzles 52 to clean each of the nozzles 52 of the nozzle group 54. That is, the cleaner 28 is capable of cleaning the nozzles 52 for each ink color.

The network interface 30 is configured to communicate with an external device and connected to the Internet 68 via a router 66. The Internet 68 is connected to the management server 70. This connection enables the printer 10 to perform data communication with the management server 70 via the network interface 30.

The management server 70 includes a CPU 72 as one example of a controller and a computer, a storage 74, and a network interface 76 as one example of a communicator. These devices are communicable with each other by a bus 78.

The CPU 72 executes processings according to a control program 80 stored in the storage 74. The control program 80 is a program which manages service for automatically ordering the cartridge 40, which will be explained in detail. It is noted that the storage 74 includes a RAM, a ROM, a flash memory, a HDD, and a buffer of the CPU 72 which are constituted in combination. The storage 74 has a data storage area 82. The data storage area 82 stores data and information required for execution of the control program 80.

The network interface 76 is configured to communicate with an external device and connected to the printer 10 via the Internet 68 and the router 66. This connection enables the management server 70 to perform data communication with the printer 10.

Variable-fee Printing Service Utilizing Communication System

The printer 10 is a designated device for a variable-fee printing service. The variable-fee printing service is a service which provides a contractor with the cartridges 40 in exchange for payment determined based on the number of printed sheets. The printer 10 counts the number of printed sheets each time when the printing operation is performed. The printer 10 then sends the management server 70 information relating to the number of printed sheets. In response, the contractor is charged in accordance with the number of printed sheets in each particular period, in exchange for the variable-fee printing service.

The printer 10 obtains information relating to a remaining amount of the ink in each of the cartridges 40 and transmits this information to the management server 70. Based on the received information, the management server 70 manages the remaining amount of the ink in each cartridge 40 used in the printer 10. When the remaining amount of the ink in the cartridge 40 used in the printer 10 has become smaller than a threshold value, the management server 70 outputs an instruction for shipping a new cartridge to a user of the printer 10. These operations save the user from having to purchase the cartridge 40, for example, and enable the printing operation to be continuously performed without running out of the ink. It is noted that the printer 10 is rented from a company offering the variable-fee printing service. Thus, a price for each printed sheet in the variable-fee printing service is set with consideration of, e.g., a rental fee of the printer 10 and a price of the cartridge.

There will be explained the variable-fee printing service in detail with reference to the sequence diagram in FIG. 3. It is noted that processings executed by the printer 10 in the sequence is executed by the CPU 12 according to the control program 36, and processings executed by the management server 70 in the sequence are executed by the CPU 72 according to the control program 80.

Figure 3:
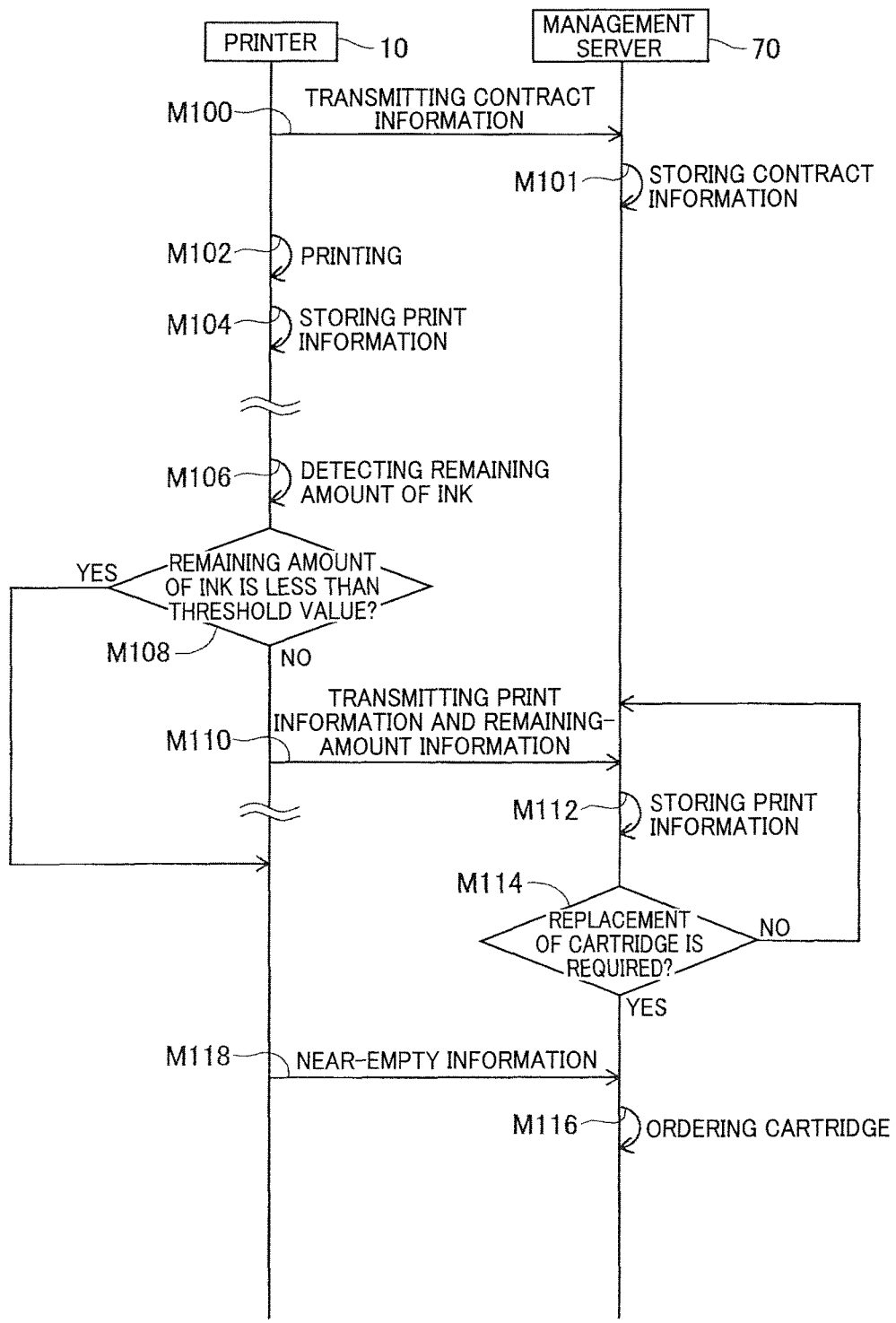
FIG. 3 is a sequence diagram illustrating an operating state of the communication system.

The sequence in FIG. 3 begins with M100 at which the printer 10 transmits contract information to the management server 70 in response to a start of the variable-fee printing service. The contract information includes identification (ID) information for identifying the printer 10. The ID information may be hereinafter referred to as "apparatus ID". When the management server 70 has received the contract information, the management server 70 at M101 stores the contract information into the data storage area 82.

When the printing operation is performed by the printer 10 (M102), the printer 10 at M104 stores print information into the data storage area 38. It is noted that the print information includes: the information relating to the number of printed sheets as one example of number-of-sheets information; information relating to the color of the ink used in the printing operation for each printing sheet (noted that this information may be hereinafter referred to as "used-ink-color information" as one example of ink information); and information relating to the date and time at which the printing operation is performed (noted that this information may be hereinafter referred to as "print execution information"). It is noted that the ink information is not information determined based on a button operation in the printing operation but is information determined based on the color of the ink actually used. That is, operation buttons for performing the printing operation include a color print button and a black-and-white print button, and when the black-and-white print button is operated, black and white printing is in some cases performed using not only the black ink but also the color ink such as the yellow ink. In this case, the ink information does not contain only the black ink because the black-and-white print button is operated, but contains the ink colors actually used in the printing operation, that is, the ink information contains not only the black ink but also the color ink or the color inks.

At M106, each time when a predetermined period, e.g., 24 hours are elapsed, the detection sensor 22 of the printer 10 detects a remaining amount of ink in each of the cartridges 40 connected to the connecting portion 20. At M108, the CPU 12 determines for each ink color whether the detected ink remaining amount is less than a threshold value. When the ink remaining amount is greater than or equal to the threshold value for all the ink colors (M108: NO), the printer 10 at M110 sends the management server 70 the print information stored at M104 and information relating to the ink remaining amount which is detected at M106 (hereinafter may be referred to as "remaining-amount information").

The management server 70 at M112 stores the received print information into the data storage area 82 in association with the apparatus ID contained in the contract information stored at M101. The management server 70 at M114 determines for each ink color whether replacement of the cartridge 40 is required, based on the received remaining-amount information. When requirement of the cartridge 40 is not required (M114: NO), the processings at M112-M114 are repeated each time when the ink remaining amount and the print information are received. When requirement of the cartridge 40 is required (M114: YES), the management server 70 at M116 orders the cartridge 40 relating to the ink color, for which the management server 70 has determined that the requirement is required. As a result, a new cartridge relating to the same color as that of the cartridge 40 for which the replacement is required is shipped to the user of the printer 10.

When the CPU 12 at M108 determines that the ink remaining amount is less than the threshold value for any of the ink colors (M108: YES), the printer 10 at M118 transmits near-empty information to the management server 70. The near-empty information indicates that the ink remaining amount is small, and there is a high possibility of running out of the ink in a few days. The near-empty information includes information indicating the ink color relating to the cartridge 40 in which the ink remaining amount is less than the threshold value. Upon receiving the near-empty information, the management server 70 at M116 orders the cartridge 40 relating to the ink color indicated by the information. As a result, a new cartridge relating to the same color as that of the cartridge 40 for which there is a high possibility that the ink runs out in a few days is shipped to the user of the printer 10.

The management server 70 receives the print information from the printer 10 in each particular period and cumulatively stores the print information. Thus, each time when the particular period, e.g., one month, is elapsed, the company offering the variable-fee printing service calculates the number of sheets printed in the printer 10 and charges the user of the printer 10 a price determined based on the calculated number of printed sheets.

Accordingly, the user having contracted the variable-fee printing service can use the automatic cartridge-delivery service at a price determined by the number of the printed sheets, giving a convenience to the user. Incidentally, a smaller amount of ordering of the cartridges is preferable for the company offering the variable-fee printing service from the viewpoint of cost. That is, the printer 10 preferably uses a smaller amount of the ink.

Now consider mode of usage of the ink in the printer 10. The ink is used not only when an image is printed on the sheet but also when cleaning of the ink-jet head 50 is performed to prevent clogging of the nozzles 52 used for the printing operation, for example. The cleaning of the ink-jet head 50 includes: cleaning automatically performed at intervals of a specific period; and cleaning performed based on an intention of the user.

The cleaning automatically performed at intervals of the specific period is necessary to ensure appropriate printing performance, and reduction in this cleaning is not preferable. On the other hand, the cleaning performed based on the intention of the user is unnecessary in some cases. For example, the cleaning of the ink-jet head 50 is in some cases performed by the intention of the user also in a state in which the clogging of the nozzles 52 does not occur, and the appropriate printing performance can be achieved. Thus, it is possible to reduce the amount of usage of the ink by reducing the cleaning of the ink-jet head 50 which is performed in the state in which the appropriate printing performance can be achieved. In the printer 10, the cleaning of the ink-jet head 50 based on the intention of the user is inhibited in the state in which the appropriate printing performance can be achieved. There will be explained this processing in detail with reference to the sequence diagrams in FIGS. 4 and 5.

Figure 6:
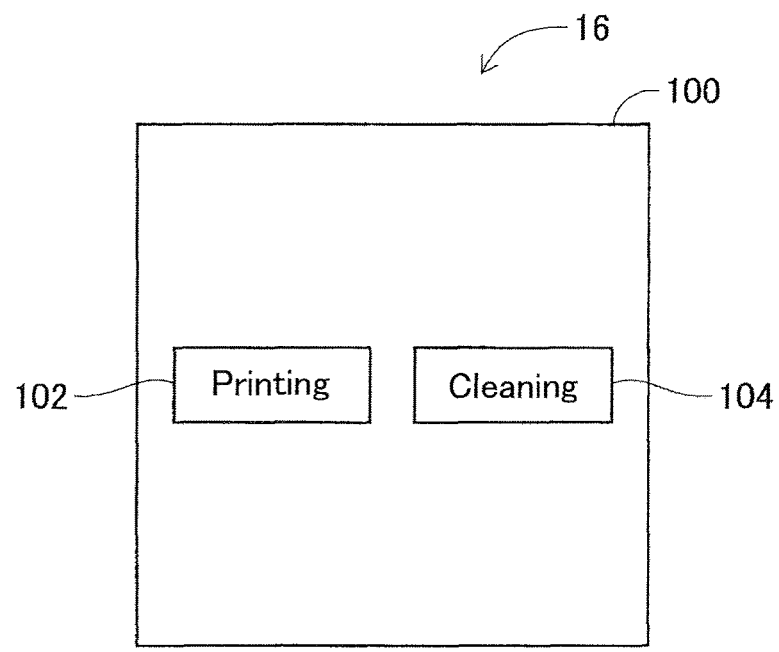
FIG. 6 is a view illustrating a print screen.

As illustrated in FIG. 6, the display 16 of the printer 10 displays a print screen 100 containing a print button 102 and a cleaning button 104. The print button 102 is a button for performing the printing operation. When the print button 102 is operated, the printing operation is performed. The cleaning button 104 is a button for performing the cleaning of the ink-jet head 50. When the user wants to perform the cleaning of the ink-jet head 50, the user operates the cleaning button 104 at M200 in FIG. 4.

Figure 7:
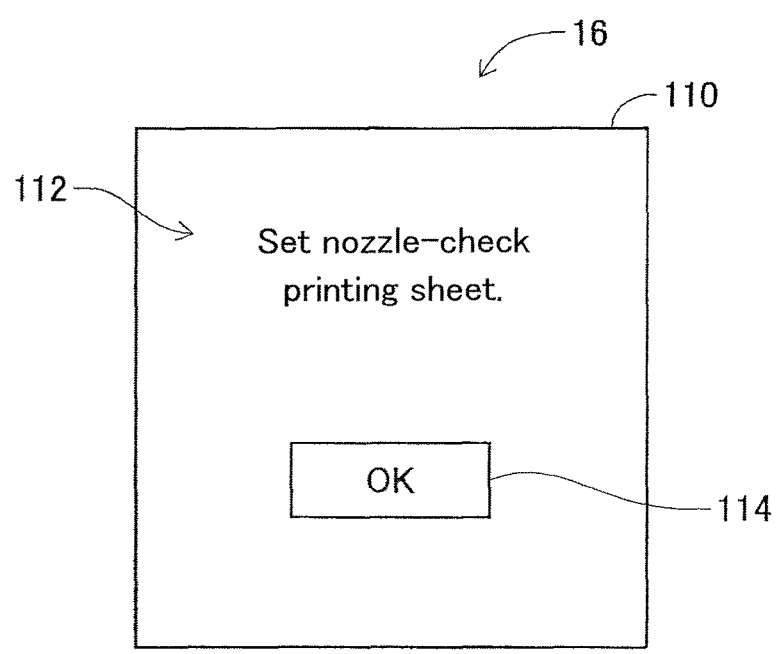
FIG. 7 is a view illustrating a nozzle-check screen.
Figure 8:
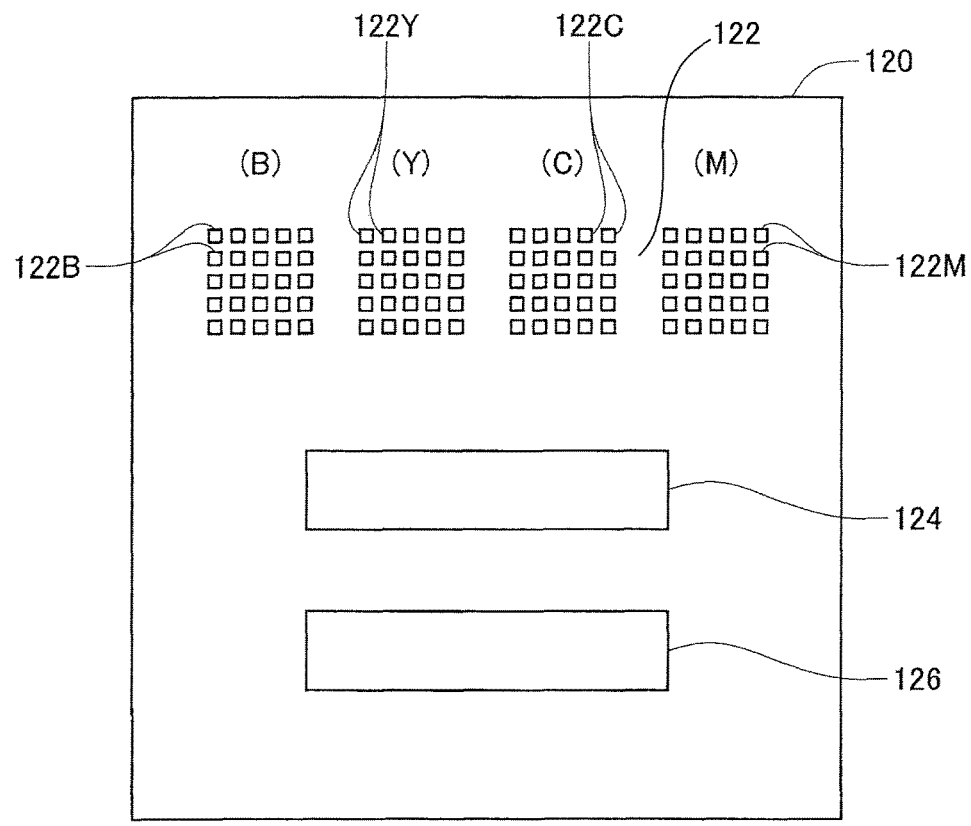
FIG. 8 is a view illustrating a nozzle-check printing sheet.

When the cleaning button 104 is operated, as illustrated in FIG. 7, the display 16 displays a nozzle-check screen 110 at M202. The nozzle-check screen 110 contains an OK button 114 and a comment 112 prompting the user to set a nozzle-check printing sheet. The nozzle-check printing sheet is a specific sheet for checking whether printing is appropriately performed for each ink color. FIG. 8 illustrates a nozzle-check printing sheet 120 on which are described (i) ink print fields 122 for the respective ink colors, (ii) a print field 124 for the identification information for identifying the printer 10 (noted that this print field may be hereinafter referred to as "apparatus-information print field"); a print field 126 for specification information for specifying the date and time (noted that this print field may be hereinafter referred to as "date-and-time-information print field"). It is noted that the ink print fields 122 include: ink print fields 122B for the black ink; ink print fields 122Y for the yellow ink; the ink print fields 122C for the cyan ink; and the ink print fields 122M for the magenta ink.

At M204, the user operates the OK button 114 on the nozzle-check screen 110 after setting the nozzle-check printing sheet 120 onto a flat bed or an automatic document feeder (ADF) according to the comment 112 displayed on the nozzle-check screen 110. When the OK button 114 is operated, the printer 10 at M206 transmits (i) information for identifying the printer 10 (noted that this information may be hereinafter referred to as "apparatus information"), (ii) information for specifying the date and time at which the OK button 114 is operated (noted that this information may be hereinafter referred to as "date-and-time information"), and (iii) the above-described print information, to the management server 70. It is noted that the apparatus information may or may not be the same as the above-described apparatus ID. In the present embodiment, the apparatus information is the apparatus ID that is for identifying the printer 10 and stored in the storage 14. This apparatus ID is read from the storage 14 and transmitted from the printer 10 to the server 70. This apparatus information is not the scan data. Also, the date-and-time information is obtained by a device of the printer 10 which measures the date and time. For example, the date-and-time information is the date and time at which the printer 10 transmits the date-and-time information to the server 70. This date-and-time information is not the scan data.

The management server 70 at M208 stores the received apparatus information and date-and-time information into the data storage area 82 in association with each other. It is noted that the apparatus information and the date-and-time information stored at M208, i.e., the apparatus information and the date-and-time information transmitted from the printer 10 at M206, may be hereinafter referred to as "transmitted apparatus information" and "transmitted date-and-time information", respectively. The transmitted apparatus information is one example of second identification information. The transmitted date-and-time information is one example of second specification information. The management server 70 at M209 cumulatively stores the received print information to the print information stored at M112. The management server 70 at M210 transmits a response to the printer 10 in response to the reception of the transmitted apparatus information, the transmitted date-and-time information, and the print information.

Upon receiving the response, the printer 10 at M212 performs a nozzle-check printing operation. In the nozzle-check printing operation, the ink of each color is ejected onto the corresponding ink print fields 122 on the nozzle-check printing sheet 120. That is, the black ink is ejected onto the ink print fields 122B from the nozzles 52 of the nozzle group 54B, the yellow ink is ejected onto the ink print fields 122Y from the nozzles 52 of the nozzle group 54Y, the cyan ink is ejected onto the ink print fields 122C from the nozzles 52 of the nozzle group 54C, and the black ink is ejected onto the ink print fields 122M from the nozzles 52 of the nozzle group 54M. As a result, images of each color are formed on the corresponding ink print fields 122. In the nozzle-check printing operation, the apparatus information is printed on the apparatus-information print field 124 of the nozzle-check printing sheet 120, and the date-and-time information is printed on the date-and-time-information print field 126 of the nozzle-check printing sheet 120. It is noted that, when printing the apparatus information on the apparatus-information print field 124, the apparatus ID stored in the storage 14 of the printer 10 is read from the storage 14, and the apparatus information is printed on the apparatus-information print field 124 based on this apparatus ID. The date-and-time information to be printed on the date-and-time-information print field 126 is date and time which are obtained by a device of the printer 10 which measures the date and time. For example, the date-and-time information to be printed on the date-and-time-information print field 126 is date and time when printing on the nozzle-check printing sheet 120 is started.

Figure 9:
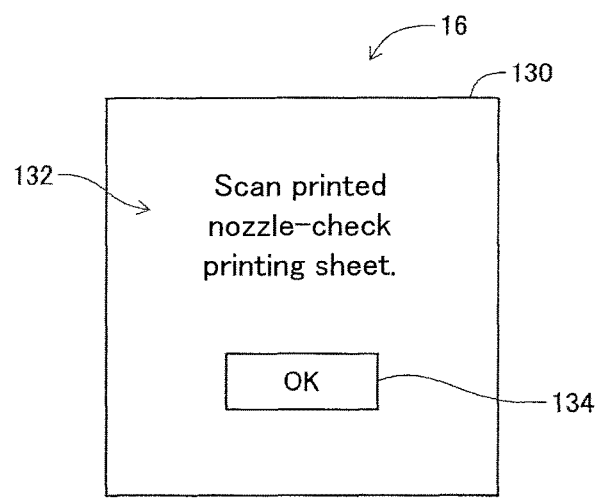
FIG. 9 is a view illustrating a scan-instruction screen.

Upon completion of the nozzle-check printing operation, as illustrated in FIG. 9, the display 16 of the printer 10 displays a scan-instruction screen 130 at M214. The scan-instruction screen 130 contains an OK button 134 and a comment 132 prompting the user to instruct the scanning operation of the printed nozzle-check printing sheet 120. At M216, the user operates the OK button 134 on the scan-instruction screen 130 after setting the printed nozzle-check printing sheet 120 onto the flat bed or the ADF according to the comment 132 displayed on the scan-instruction screen 130.

In response to the operation on the OK button 134, the printer 10 performs the scanning operation at M218. Upon completion of the scanning operation, scan data created by the scanning operation is transmitted to the management server 70 at M220. Upon receiving the scan data, the management server 70 analyzes the scan data and extracts the apparatus information printed on the apparatus-information print field 124 and the date-and-time information printed on the date-and-time-information print field 126. The management server 70 at M222 stores the extracted apparatus information and date-and-time information into the data storage area 82 in association with each other. It is noted that the apparatus information and the date-and-time information stored at M222, i.e., the apparatus information and the date-and-time information printed on the nozzle-check printing sheet 120 at M212, may be hereinafter referred to as "printing-apparatus information" and "printing date-and-time information", respectively. The printing-apparatus information is one example of first identification information. The printing date-and-time information is one example of first specification information.

The management server 70 analyzes the received scan data and extracts the images printed on the ink print fields 122 for each ink color. The management server 70 at M224 determines for each ink color whether the cleaning of the ink-jet head 50 is required, based on, e.g., a density and the presence or absence of lack of each of the images on the ink print fields 122. That is, the management server 70 determines whether the images are appropriately printed on the respective ink print fields 122, based on, e.g., the density and the presence or absence of lack of each of the images on the ink print fields 122. When the images are appropriately printed, the management server 70 determines that the cleaning is not required. When the images are not appropriately printed, the management server 70 determines that the cleaning is required.

When the management server 70 determines that the cleaning is required, the management server 70 determines the strength of the cleaning based on the quality (degree) of the printed images. The strength of the cleaning indicates a driving force of the cleaner 28 of the printer 10, i.e., a sucking force of the suction pump 62. Thus, the strength of the cleaning is determined so as to increase with decrease in quality of the printed images and so as to decrease with increase in quality of the printed images.

When the management server 70 determines that the cleaning is required (M224: YES), the management server 70 at M226 determines whether the transmitted apparatus information and the transmitted date-and-time information at M208 respectively coincide with the printing-apparatus information and the printing date-and-time information at M222. When the transmitted apparatus information and the transmitted date-and-time information at M208 do not coincide with the printing-apparatus information and the printing date-and-time information at M222 (M226: NO), the management server 70 at M228 transmits the cleaning-nonpermitted information as one example of non-permission information to the printer 10. Also when the management server 70 determines at M224 that the cleaning is not required (M224: NO), the management server 70 at M228 transmits the cleaning-nonpermitted information to the printer 10.

Figure 10:
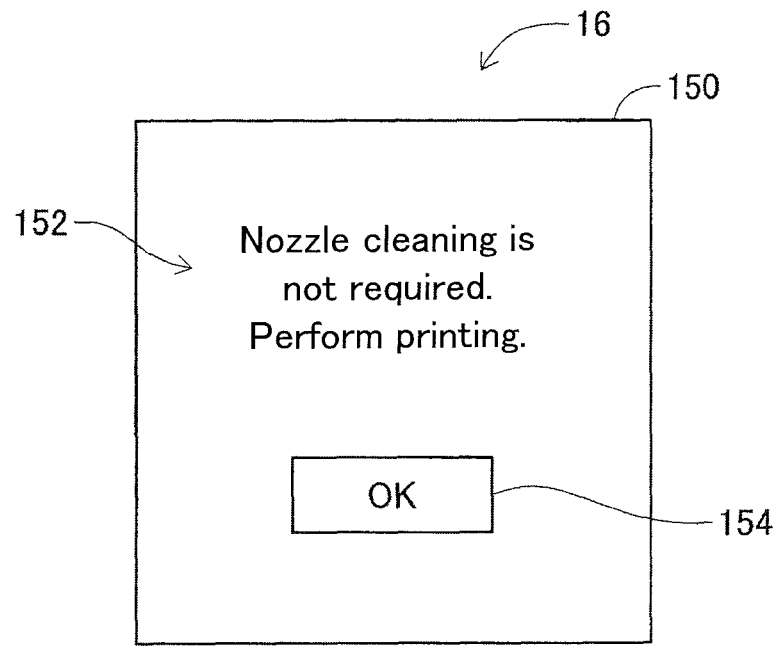
FIG. 10 is a view illustrating a notification screen.

Upon receiving the cleaning-nonpermitted information, as illustrated in FIG. 10, the printer 10 at M229 displays a notification screen 150 on the display 16. The notification screen 150 contains an OK button 154 and a comment 152 indicating that the cleaning of the ink-jet head 50 is not required. When the OK button 154 is operated on the notification screen 150, the display 16 displays the print screen 100 (see FIG. 6) instead of the notification screen 150. That is, even though the cleaning button 104 is operated, the cleaning of the ink-jet head 50 is not performed, and the print screen 100 is displayed on the display 16.

Figure 5:
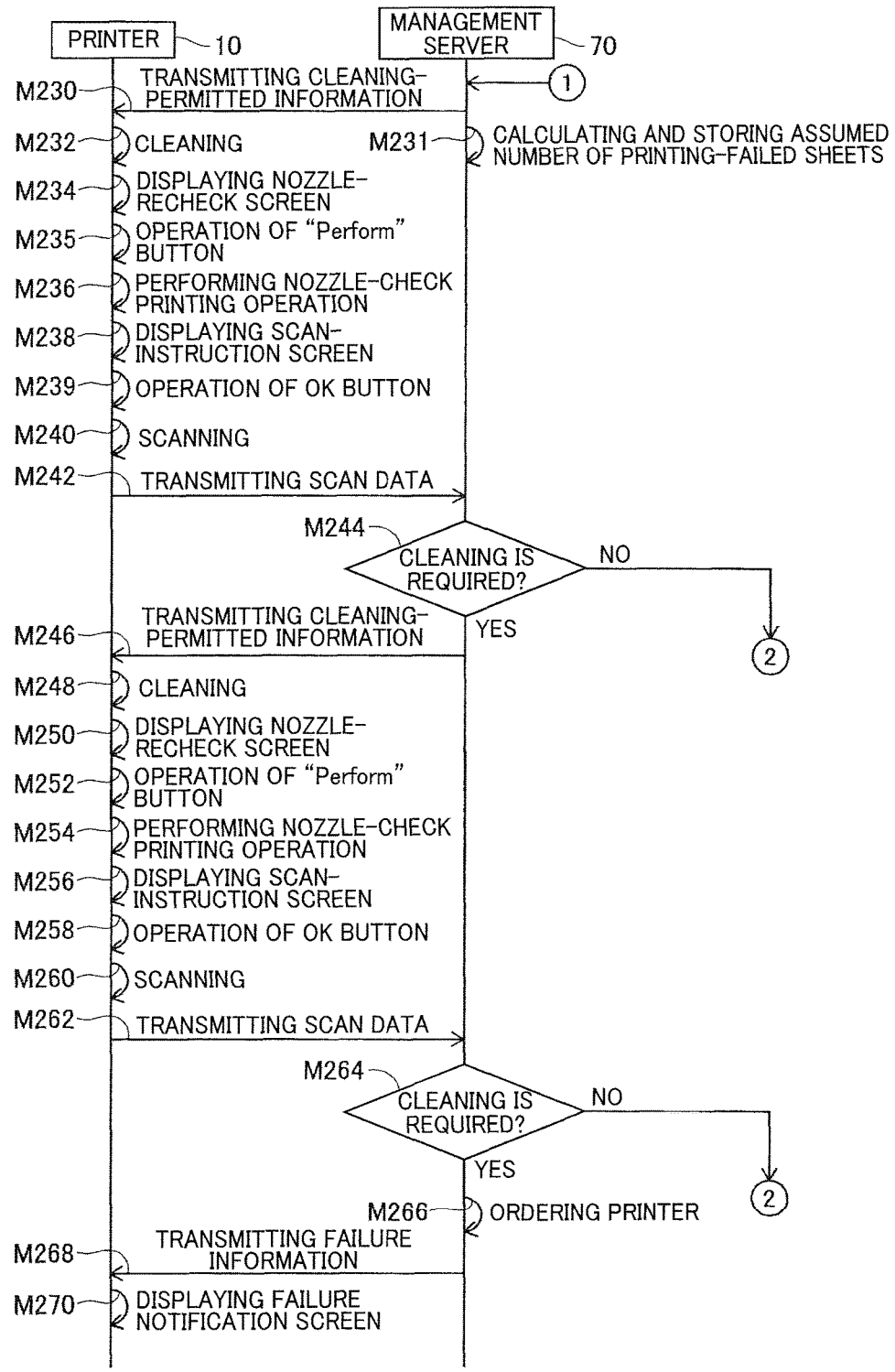
FIG. 5 is a sequence diagram illustrating an operating state of the communication system.

When the management server 70 at M226 determines that the transmitted apparatus information and the transmitted date-and-time information at M208 respectively coincide with the printing-apparatus information and the printing date-and-time information at M222 (M226: YES), as illustrated in FIG. 5, the management server 70 at M230 transmits cleaning-permitted information as one example of permission information to the printer 10. It is noted that whether the transmitted date-and-time information coincides with the printing date-and-time information is determined with consideration of the timings when the transmitted date-and-time information and the printing date-and-time information are measured. For example, in the case where the transmitted date-and-time information is measured at printing of the transmitted date-and-time information, and the printing date-and-time information is measured at printing of the printing date-and-time information, when a difference in time between the date and time of transmission of the transmitted date-and-time information and the date and time of printing of the printing date-and-time information is substantially the same as a difference in time between the transmitted date-and-time information and the printing date-and-time information, it is determined that the transmitted date-and-time information and the printing date-and-time information are the same as each other. It is further noted that this cleaning-permitted information includes: information relating to the ink color for which the management server 70 at M224 determines that the cleaning is required; and information relating to the strength of the cleaning for which the management server 70 at M224 determines that the cleaning is required.

In the case where the cleaning-permitted information is transmitted to the printer 10, it is considered that the images are not appropriately printed by the printer 10 due to inappropriate ejection of the ink from the ink-jet head 50. In the printer 10, since the contractor is charged based on the number of printed sheets as described above, it is not preferable to charge the contractor for the printing operation in which the image is not appropriately printed. Thus, in the case where the cleaning-permitted information is transmitted to the printer 10, the management server 70 at M231 calculates the number of printed sheets on which it is assumed that the image is not appropriately printed (noted that this number may be hereinafter referred to as "assumed number of printing-failed sheets") and stores this assumed number of printing-failed sheets into the data storage area 82.

Specifically, the management server 70 specifies the date and time based on the transmitted date-and-time information stored at M208 and calculates, based on the print information stored at M112 and M206, the number of sheets printed by the printing operation performed in the printer 10 in a certain period extending from the specified date and time to a certain time point, e.g., the date and time a day before the specified date and time. The print execution information contained in the print information is used in this calculation. Moreover, the management server 70 calculates the number of printed sheets using the ink color for which the management server 70 at M224 determines that the cleaning is required, among the calculated number of printed sheets. The used-ink-color information contained in the print information is used in this calculation. This calculated number of printed sheets is the assumed number of printing-failed sheets and stored into the data storage area 82.

When the cleaning-permitted information is transmitted from the management server 70 to the printer 10, the printer 10 at M232 performs the cleaning of the ink-jet head 50. In this cleaning, the suction pump 62 is operated by a driving force based on the information relating to the strength of the cleaning and contained in the cleaning-permitted information, to perform the cleaning of the nozzle group 54 related to the information relating to the ink color and contained in the cleaning-permitted information.

Figure 11:
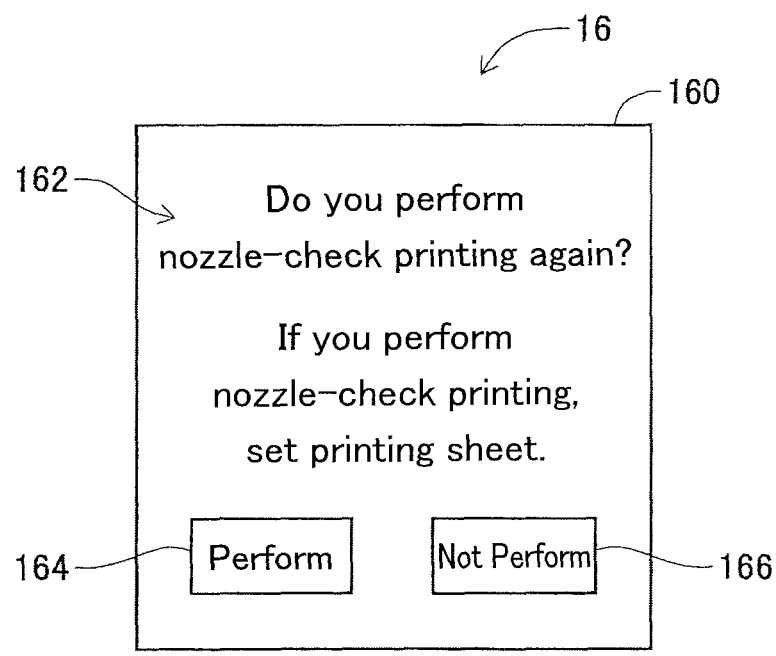
FIG. 11 is a view illustrating a nozzle-recheck screen.

Upon completion of the cleaning of the ink-jet head 50, as illustrated in FIG. 11, the display 16 displays a nozzle-recheck screen 160 at M234. The nozzle-recheck screen 160 contains a "Perform" button 164, a "Not Perform" button 166, and a comment 162 inquiring about re-execution of the nozzle-check printing and prompting the user to set the nozzle-check printing sheet in the case where the nozzle-check printing is performed again. When the "Not Perform" button 166 is operated on the nozzle-recheck screen 160, the display 16 displays the print screen 100 to establish a state in which a normal printing operation can be performed.

In the case where the user wants to perform the nozzle-check printing again to check a result of the cleaning of the ink-jet head 50, the user at M235 operates the "Perform" button 164 after setting the nozzle-check printing sheet 120 onto the flat bed or the ADF according to the comment 162 on the nozzle-recheck screen 160. In response, the printer 10 performs the nozzle-check printing operation at M236. It is noted that this nozzle-check printing operation is the same as the nozzle-check printing operation performed at M212.

Upon completion of the nozzle-check printing operation, the CPU 12 of the printer 10 executes processings at M238-M242. Since the processings at M238-M242 are the same as the above-described processings at M214-M220, an explanation thereof is dispensed with. When the scan data is transmitted from the printer 10 to the management server 70 at M242, as in the processing at M224, the management server 70 at M244 analyzes the received scan data and determines for each ink color whether the cleaning of the ink-jet head 50 is required. In the processing at M244, when the management server 70 determines that the cleaning is required, the management server 70 determines the strength of the cleaning based on the scan data received at M220 and the scan data received at M242.

Specifically, the scan data received at M220 and the scan data received at M242 are compared with each other for the image of the ink color for which the management server 70 determines that the cleaning is required. That is, the image before the cleaning of the ink-jet head 50 at M232 and the image after the cleaning are compared with each other. The strength of the cleaning is determined so as to increase with decrease in difference in the images before and after the cleaning and so as to decrease with increase in difference in the images before and after the cleaning.

Figure 4:
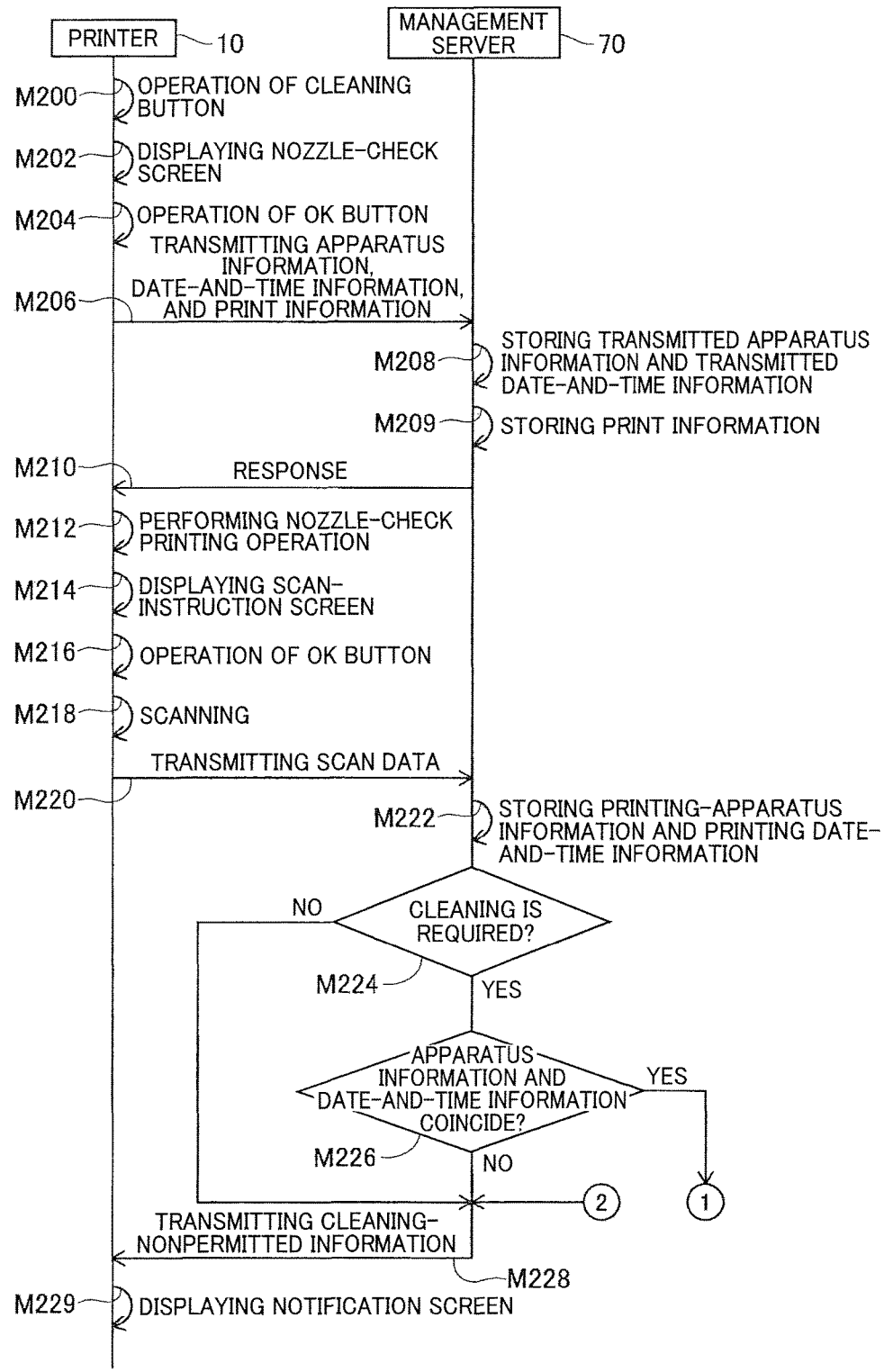
FIG. 4 is a sequence diagram illustrating an operating state of the communication system.

When the management server 70 determines at M244 that the cleaning is not required (M244: NO), as illustrated in FIG. 4, the management server 70 at M228 transmits the cleaning-nonpermitted information to the printer 10. As a result, the printer 10 does not perform the cleaning of the ink-jet head 50, and as illustrated in FIG. 10 the notification screen 150 is displayed on the display 16 at M229.

When the management server 70 at M244 determines that the cleaning is required (YES), as illustrated in FIG. 5, the management server 70 at M246 transmits the cleaning-permitted information to the printer 10. It is noted that this cleaning-permitted information includes: information relating to the ink color for which the management server 70 at M244 determines that the cleaning is required; and information relating to the strength of the cleaning for which the management server 70 at M244 determines that the cleaning is required. The printer 10 performs the cleaning of the ink-jet head 50 at M248.

Upon performing the cleaning of the ink-jet head 50, the CPU 12 of the printer 10 executes processings at M250-M262. Since the processings at M250-M262 are the same as the above-described processings at M234-M242, an explanation thereof is dispensed with. When the scan data is transmitted from the printer 10 to the management server 70 at M262, as in the processing at M224, the management server 70 at M264 analyzes the received scan data and determines for each ink color whether the cleaning of the ink-jet head 50 is required. When the management server 70 determines that the cleaning is not required (M264: NO), the management server 70 executes the processing at M228 (see FIG. 4).

When the management server 70 determines that the cleaning is required, a failure in the printer 10 is suspected. Specifically, before the management server 70 at M264 determines that the cleaning is required, the printer 10 successively performs the cleaning of the ink-jet head 50 twice at M232 and M248. A situation in which the management server 70 nevertheless determines that the cleaning is required at M264 indicates that it is difficult for the cleaning to eliminate a problem of printing, and there is a high possibility of a failure having occurred in the ink-jet head 50 of the printer 10, for example. Thus, when the management server 70 determines that the cleaning is required (M264: YES), the management server 70 at M266 orders a new printer of the same model as that of the printer 10, to the user of the printer 10.

The management server 70 at M268 transmits failure information to the printer 10. Upon receiving the failure information, as illustrated in FIG. 12, the printer 10 at M270 displays a failure notification screen 170 on the display 16. Since there is a high possibility of a failure having occurred in the printer 10, the failure notification screen 170 contains a comment 172 indicating that a new printer is to be shipped. That is, the variable-fee printing service includes a service for replacing the printer 10 having a high possibility of failure, with a new printer.

In the communication system 1 as described above, when the cleaning button 104 is operated by the user, it is determined whether the cleaning of the ink-jet head 50 is required, based on the scan data of the document printed by the printer 10. When the cleaning is required, the printer 10 performs the cleaning. When the cleaning is not required, the printer 10 does not perform the cleaning. That is, the cleaning of the ink-jet head 50 based on the intention of the user is permitted in a state in which the appropriate printing performance cannot be achieved due to the clogging of the nozzles 52, for example. This configuration reduces unnecessary cleaning of the ink-jet head 50, resulting in reduction in the amount of usage of the ink.

Even in the case where it is determined based on the scan data that the cleaning is required, when the transmitted apparatus information and the transmitted date-and-time information transmitted to the management server 70 do not respectively coincide with the printing-apparatus information and the printing date-and-time information printed on the nozzle-check printing sheet 120, the cleaning of the ink-jet head 50 is not permitted. This prevents the cleaning of the ink-jet head 50 based on the operation of the user. Specifically, there is a case where the printing operation is performed on the nozzle-check printing sheet 120 by a printer different from the printer 10, and this printed nozzle-check printing sheet 120 is scanned by the printer 10, for example. In this case, since the printing-apparatus information and the transmitted apparatus information are different from each other, the cleaning of the ink-jet head 50 based on the operation of the user is not performed. Also, there is a case where the user preserves the nozzle-check printing sheet 120 for which the user previously performed the printing operation using the printer 10, and then the user operates the printer 10 to scan the nozzle-check printing sheet 120. In this case, since the printing date-and-time information and the transmitted date-and-time information are different from each other, the cleaning of the ink-jet head 50 based on the operation of the user is not performed. This prevents the cleaning of the ink-jet head 50 based on the operation of the user.

The determination of whether the cleaning is required is executed for each ink color, and the printer 10 performs the cleaning for the nozzle group 54 relating to the ink color for which it is determined that the cleaning is required. This configuration reduces the cleaning of the nozzle group 54 relating to the ink color not requiring the cleaning, resulting in reduction in the amount of usage of the ink. The strength of the cleaning is also determined in the determination of whether the cleaning is required. This processing ensures good cleaning.

In the case where, after the cleaning of the ink-jet head 50 is performed, the cleaning is requested again, and it is determined that the cleaning is required, the image before the cleaning of the ink-jet head 50 and the image after the cleaning are compared with each other, and the strength of the cleaning is determined in accordance with a difference between the images. This enables second cleaning to be performed well.

In the case where it is determined that the cleaning of the ink-jet head 50 is required, the management server 70 calculates the assumed number of printing-failed sheets on which it is assumed that the image is not appropriately printed, and stores this assumed number of printing-failed sheets. This configuration enables the company offering the variable-fee printing service to determine an amount of charge for the user by discounting the assumed number of printing-failed sheets when calculating the number of sheets printed by the printer 10 in each particular period.

When the management server 70 determines that the cleaning is required again even though the cleaning of the ink-jet head 50 is performed twice successively, a new printer is shipped to the user. This configuration enables the user to replace the printer 10 having a high possibility of failure, with a new printer at an early timing.

While the embodiment has been described above, it is to be understood that the disclosure is not limited to the details of the illustrated embodiment, but may be embodied with various changes and modifications, which may occur to those skilled in the art, without departing from the spirit and scope of the disclosure. Specifically, while the printer 10 is capable of performing the scanning operation in the above-described embodiment, the present disclosure is applicable to a printer not capable of performing the scanning operation. Specifically, the nozzle-check printing operation is performed by the printer not capable of performing the scanning operation. The printer capable of performing the scanning operation then scans the nozzle-check printing sheet 120 printed by the nozzle-check printing and transmits the scan data of the nozzle-check printing sheet 120 to the management server 70. The determination of whether the cleaning is required is performed based on the scan data, and the cleaning-permitted information or the cleaning-nonpermitted information is transmitted, based on the result of this determination, to the printer having performed the nozzle-check printing operation. These processings enable the present disclosure to be applied to the printer not capable of performing the scanning operation. In this case, however, the management server 70 does not determine whether the transmitted apparatus information and the transmitted date-and-time information respectively coincide with the printing-apparatus information and the printing date-and-time information. That is, it is not possible to prevent the cleaning based on the operation of the user. Thus, after the nozzle-check printing operation is performed, a screen prompting the user to preserve the printed nozzle-check printing sheet 120 is displayed on a display of the printer having performed the nozzle-check printing operation. In this case, for example, the user is requested to send the printed nozzle-check printing sheet 120 to the company offering the variable-fee printing service by mail, whereby the company offering the variable-fee printing service can check the presence or absence of the cleaning based on the operation of the user, thereby preventing the cleaning based on the operation of the user.

In the above-described embodiment, the ink is forcibly discharged from the nozzles 52 of the ink-jet head 50 by the suction pump 62 in the cleaning of the ink-jet head 50, that is, purging is performed as the cleaning of the ink-jet head 50. However, another technique may be used. For example, the ink may be ejected from the nozzles 52 by operations of the actuators 56 in the cleaning of the ink-jet head 50, that is, flushing may be performed as the cleaning of the ink-jet head 50.

In the above-described embodiment, the management server 70 directly receives various kinds of information from the printer 10 but may indirectly receive the information via a personal computer (PC), for example. That is, the printer 10 may be connected to the PC via, e.g., a USB, a LAN, or a wireless LAN, and in this configuration various kinds of information on the printer 10 may be transmitted from the PC to the management server 70.

The management server 70 is constituted by a single web server in the above-described embodiment but may be constituted by a plurality of web servers.

While the processings illustrated in FIGS. 3-5 are executed by the CPU 12 or the CPU 72 in the above-described embodiment, other devices may execute these processings. For example, these processings may be executed by an ASIC or other logical integrated circuits and may be executed by cooperation of the CPU, the ASIC, and other the logical integrated circuits, for example.

What is claimed is:

1. A server, comprising:
   a communicator communicable with an apparatus configured to perform a scanning operation and a printing operation using an ink-jet head; and
   a controller configured to control the server to perform:
      receiving, from the apparatus, nozzle-check-scan data that is scan data of a nozzle-check printing sheet printed by the ink-jet head in a nozzle-check printing operation instructed by a user of the apparatus;
      determining whether cleaning of the ink-jet head is required, based on the nozzle-check-scan data;
      transmitting permission information to the apparatus when the server determines that the cleaning of the ink-jet head is required, the permission information indicating permission of the cleaning of the ink-jet head; and
      transmitting non-permission information to the apparatus when the server determines that the cleaning of the ink-jet head is not required, the non-permission information indicating non-permission of the cleaning of the ink-jet head.

2. The server according to claim 1, wherein the controller is configured to control the server to perform:
   receiving scan data representing the nozzle-check printing sheet on which first identification information for identifying the apparatus is printed, from the apparatus as the nozzle-check-scan data;
   receiving second identification information for identifying the apparatus, from the apparatus not as the nozzle-check-scan data;
   determining whether a first identified apparatus identified by the first identification information included in the nozzle-check-scan data is identical to a second identified apparatus identified by the received second identification information;
   transmitting the permission information to the apparatus when the server determines that the cleaning is required, based on the nozzle-check-scan data and when the server determines that the first identified apparatus is identical to the second identified apparatus; and
   transmitting the non-permission information to the apparatus when the server determines that the cleaning is required, based on the nozzle-check-scan data and when the server determines that the first identified apparatus is not identical to the second identified apparatus.

3. The server according to claim 2, wherein the controller is configured to control the server to perform:
   receiving scan data representing the nozzle-check printing sheet on which the first identification information and first specification information for specifying date and time are printed, from the apparatus as the nozzle-check-scan data;

receiving second specification information for specifying date and time, from the apparatus not as the nozzle-check-scan data;

determining whether the first identified apparatus identified by the nozzle-check-scan data including the first identification information and the first specification information is identical to the second identified apparatus identified by the second identification information;

determining whether the date and time specified by the first specification information included in the nozzle-check-scan data coincide with the date and time specified by the received second specification information;

transmitting the permission information to the apparatus when the server determines that the cleaning is required, based on the nozzle-check-scan data, when the server determines that the first identified apparatus is identical to the second identified apparatus, and when the date and time specified by the first specification information included in the nozzle-check-scan data coincide with the date and time specified by the received second specification information; and transmitting the non-permission information to the apparatus when the server determines that the cleaning is required, based on the nozzle-check-scan data, and when the server determines that the first identified apparatus is not identical to the second identified apparatus or when the date and time specified by the first specification information included in the nozzle-check-scan data do not coincide with the date and time specified by the received second specification information.

4. The server according to claim 1,
wherein the ink-jet head comprises a plurality of nozzle groups, each as a nozzle group, respectively corresponding to different ink colors,
wherein the controller is configured to control the server to perform:
for each of the plurality of nozzle groups, determining whether the cleaning of the nozzle group is required, based on the received nozzle-check-scan data; and
for each of the plurality of nozzle groups, transmitting any one of (i) permission information indicating permission of cleaning of the nozzle group and (ii) non-permission information indicating non-permission of cleaning of the nozzle group, to the apparatus.

5. The server according to claim 4,
wherein the apparatus comprises a cleaner configured to perform cleaning of the nozzle group for each of the plurality of nozzle groups, and
wherein the controller is configured to control the server to perform:
based on the received nozzle-check-scan data, determining a driving force of the cleaner corresponding to the nozzle group for which the server determines that the cleaning is required; and
transmitting (i) the permission information indicating permission of cleaning of the nozzle group for which the server determines that the cleaning is required and (ii) the determined driving force of the cleaner, to the apparatus.

6. The server according to claim 1,
wherein the apparatus is a subject of a service which offers an ink cartridge in exchange for payment determined based on the number of printed sheets, and
wherein the controller is configured to control the server to perform:
receiving number-of-sheets information from the apparatus, the number-of-sheets information relating to the number of printing sheets printed by the apparatus;
when the server determines that the cleaning of the ink-jet head is required, determining, based on the received number-of-sheets information, the number of the printing sheets printed by the apparatus in a particular period extending before the cleaning of the ink-jet head is performed; and
storing the determined number of the printing sheets.

7. The server according to claim 6,
wherein the ink-jet head comprises a plurality of nozzle groups, each as a nozzle group, respectively corresponding to different ink colors, and
wherein the controller is configured to control the server to perform:
for each of the plurality of nozzle groups, determining whether the cleaning of the nozzle group is required, based on the received nozzle-check-scan data;
receiving ink information relating to an ink color used for each of the printing sheets printed by the apparatus;
determining, based on the received ink information and the received number-of-sheets information, the number of the printing sheets printed by the apparatus, in the particular period extending before the cleaning of the ink-jet head is performed, with the ink color corresponding to the nozzle group for which the server determines that the cleaning is required; and
storing the determined number of the printing sheets.

8. The server according to claim 1,
wherein the apparatus comprises a cleaner configured to perform cleaning of the ink-jet head, and
wherein the controller is configured to control the server to perform:
receiving, from the apparatus, first scan data as the nozzle-check-scan data representing the nozzle-check printing sheet printed by the ink-jet head;
receiving, from the apparatus, second scan data representing a printing sheet printed by the ink-jet head for which the cleaning is performed based on the permission information transmitted when the server determines, based on the received first scan data, that the cleaning is required;
determining, based on the received second scan data, whether the cleaning of the ink-jet head is required; and
when the server determines, based on the received second scan data, that the cleaning is required, determining a driving force of the cleaner based on the received first scan data and the received second scan data and transmitting the permission information and the driving force of the cleaner to the apparatus.

9. A non-transitory storage medium storing a program readable by a computer of a server comprising a communicator communicable with an apparatus configured to perform a scanning operation and a printing operation using an ink-jet head, the program being configured to cause the server to perform:
receiving, from the apparatus, nozzle-check-scan data that is scan data of a nozzle-check printing sheet printed by the ink-jet head in a nozzle-check printing operation instructed by a user of the apparatus;
determining whether cleaning of the ink-jet head is required, based on the received nozzle-check-scan data;
transmitting permission information to the apparatus when the server determines that the cleaning of the ink-jet head is required, the permission information indicating permission of the cleaning of the ink-jet head; and
transmitting non-permission information to the apparatus when the server determines that the cleaning of the ink-jet head is not required, the non-permission information indicating non-permission of the cleaning of the ink-jet head.

10. A server, comprising:
a communicator communicable with an apparatus configured to perform a scanning operation and a printing operation using an ink-jet head; and
a controller configured to control the server to perform:
receiving, from the apparatus, scan data representing a printing sheet printed by the ink-jet head;
determining whether cleaning of the ink-jet head is required, based on the received scan data;
transmitting permission information to the apparatus when the server determines that the cleaning of the ink-jet head is required, the permission information indicating permission of the cleaning of the ink-jet head; and
transmitting non-permission information to the apparatus when the server determines that the cleaning of the ink-jet head is not required, the non-permission information indicating non-permission of the cleaning of the ink-jet head,
wherein the controller is further configured to control the server to perform:
receiving scan data representing the printing sheet on which first identification information for identifying the apparatus is printed, from the apparatus as the scan data;
receiving second identification information for identifying the apparatus, from the apparatus not as the scan data;
determining whether a first identified apparatus identified by the first identification information included in the scan data is identical to a second identified apparatus identified by the received second identification information;
transmitting the permission information to the apparatus when the server determines that the cleaning is required, based on the scan data and when the server determines that the first identified apparatus is identical to the second identified apparatus; and
transmitting the non-permission information to the apparatus when the server determines that the cleaning is required, based on the scan data and when the server determines that the first identified apparatus is not identical to the second identified apparatus.

11. A non-transitory storage medium storing a program readable by a computer of a server comprising a communicator communicable with an apparatus configured to perform a scanning operation and a printing operation using an ink-jet head,
the program being configured to cause the server to perform:
receiving, from the apparatus, scan data representing a printing sheet printed by the ink-jet head;
determining whether cleaning of the ink-jet head is required, based on the received scan data;
transmitting permission information to the apparatus when the server determines that the cleaning of the ink-jet head is required, the permission information indicating permission of the cleaning of the ink-jet head; and
transmitting non-permission information to the apparatus when the server determines that the cleaning of the ink-jet head is not required, the non-permission information indicating non-permission of the cleaning of the ink-jet head,
wherein the program is further configured to cause the server to perform:
receiving scan data representing the printing sheet on which first identification information for identifying the apparatus is printed, from the apparatus as the scan data;
receiving second identification information for identifying the apparatus, from the apparatus not as the scan data;
determining whether a first identified apparatus identified by the first identification information included in the scan data is identical to a second identified apparatus identified by the received second identification information;
transmitting the permission information to the apparatus when the server determines that the cleaning is required, based on the scan data and when the server determines that the first identified apparatus is identical to the second identified apparatus; and
transmitting the non-permission information to the apparatus when the server determines that the cleaning is required, based on the scan data and when the server determines that the first identified apparatus is not identical to the second identified apparatus.

* * * * *